Jan. 5, 1926.   1,568,935
P. A. UDALL
MULTIPLE SPINDLE SCREW MACHINE
Filed Dec. 18, 1919   3 Sheets-Sheet 1
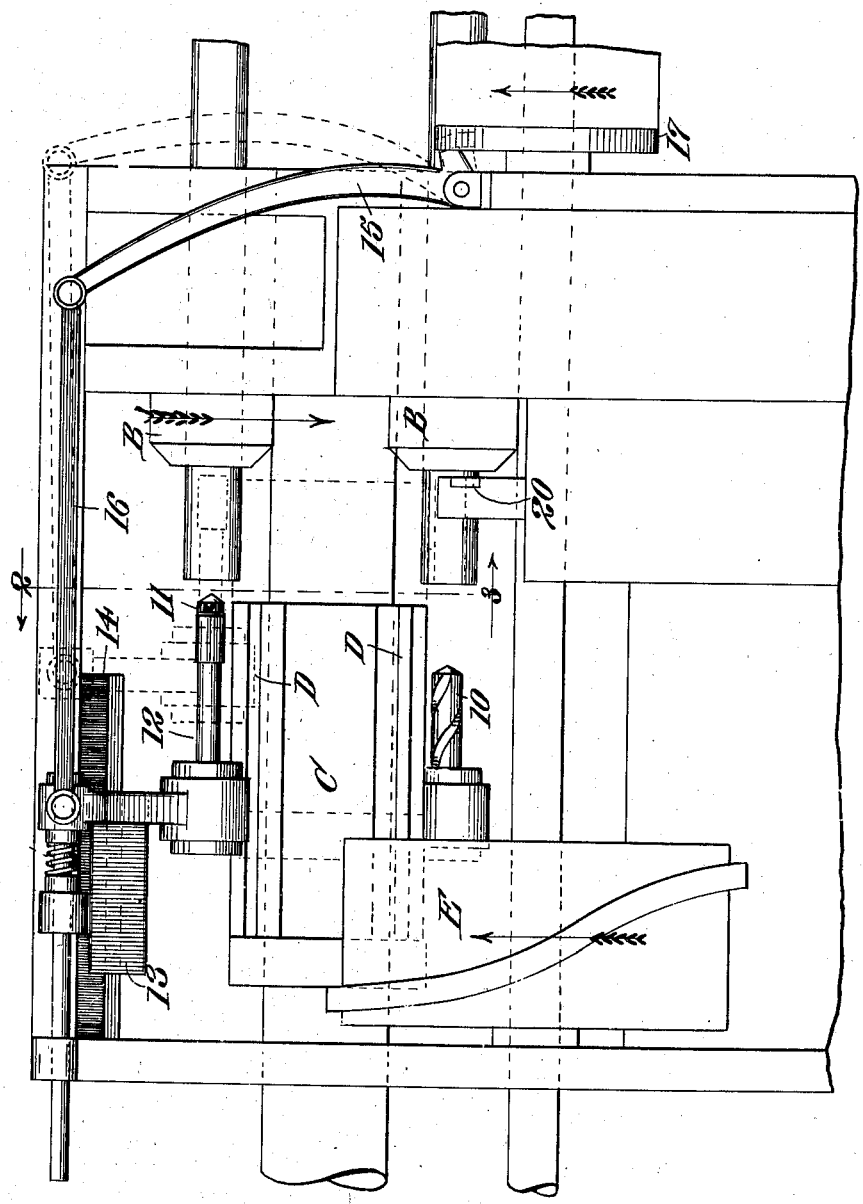
INVENTOR
Phillip A. Udall
BY Strong & Townsend
ATTORNEYS Jan. 5, 1926.  1,568,935
P. A. UDALL
MULTIPLE SPINDLE SCREW MACHINE
Filed Dec. 18, 1919   3 Sheets-Sheet 2
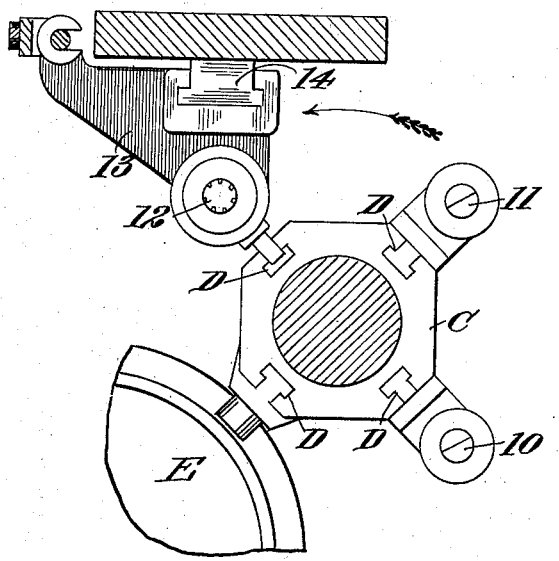
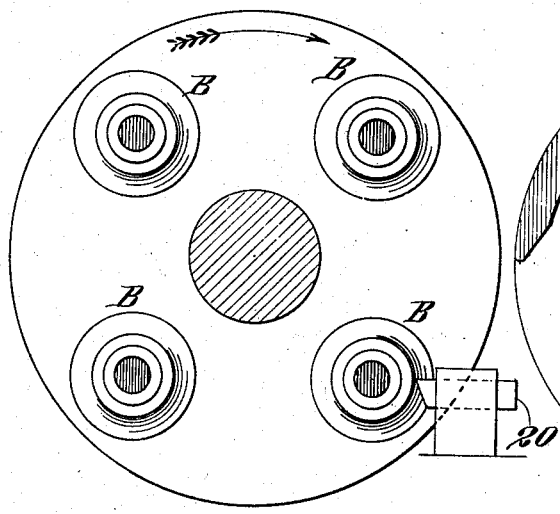
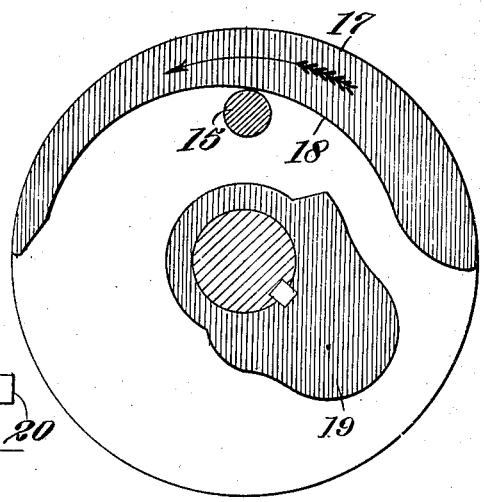
INVENTOR
Phillip A. Udall
BY Strong & Townsend
ATTORNEYS Jan. 5, 1926.
P. A. UDALL
1,568,935
MULTIPLE SPINDLE SCREW MACHINE
Filed Dec. 18, 1919  3 Sheets-Sheet 3
Fig. 5.
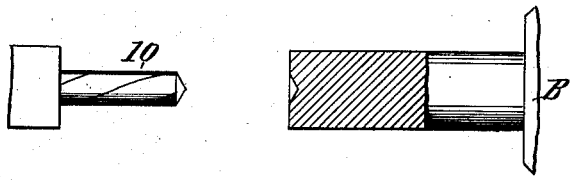
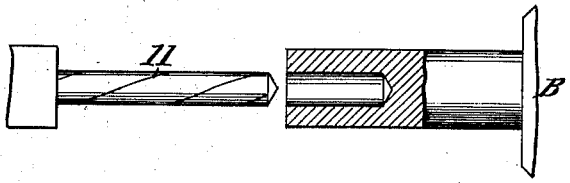
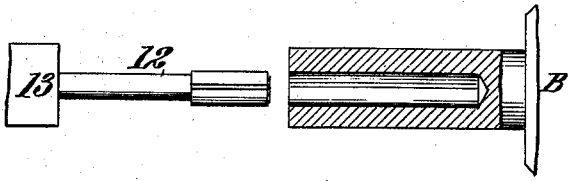
Fig. 6.
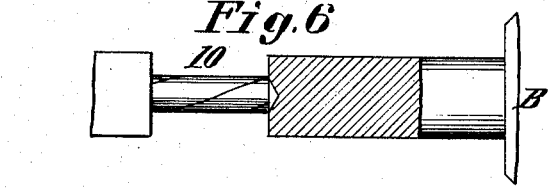
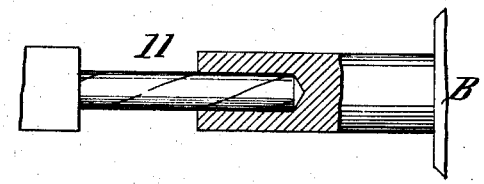
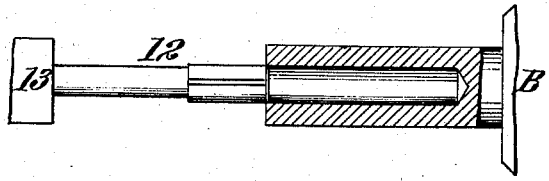
Fig. 7.
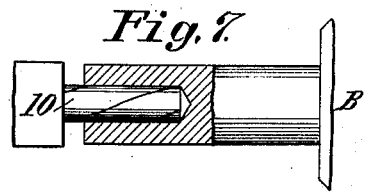
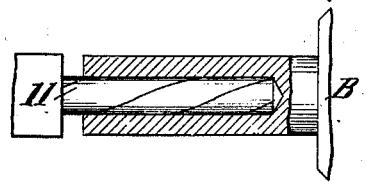
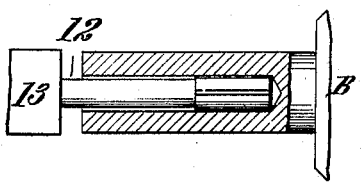
Fig. 8.
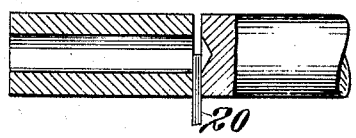
INVENTOR
Phillip A. Udall
BY Strong & Townsend
ATTORNEYS Patented Jan. 5, 1926.

1,568,935

UNITED STATES PATENT OFFICE.

PHILLIP A. UDALL, OF STOCKTON, CALIFORNIA, ASSIGNOR, BY MESNE ASSIGNMENTS, TO CATERPILLAR TRACTOR CO., A CORPORATION OF CALIFORNIA.

MULTIPLE-SPINDLE SCREW MACHINE.

Application filed December 18, 1919. Serial No. 345,833.

*To all whom it may concern:*

Be it known that PHILLIP A. UDALL, a citizen of the United States, residing at Stockton, in the county of San Joaquin and State of California, has invented new and useful Improvements in Multiple-Spindle Screw Machines, of which the following is a specification.

This invention relates to multiple spindle screw machines and has for its object to increase the production of machines of this character.

In certain kinds of work done on multiple spindle screw machines, for instance, drilling and reaming to obtain the maximum production, each spindle should carry a bar or stock and all bars should be operated upon simultaneously, the various operations being as nearly the same in time interval as possible, and carried on in progressive order. Standard types of machines of this class will not always permit of proper division of the work whereby to equalize the time interval operation, for the reason that all of the boring and reaming tools are carried by a single tool holder and consequently are fed at the same rate of advance. It often happens, as for instance in drilling and reaming, reaming operations should be speeded up and the time interval for the drilling operation cut down by dividing it between two or more drills.

In the present invention, I provide a separate feeding mechanism for one of the tools whereby its rate of feeding motion may be varied with relation to that of the other tools. One form which my invention may assume is exemplified in the following description and illustrated in the accompanying drawings, in which:—

Fig. 1 shows a side elevation of a multiple spindle screw machine embodying my invention.

Fig. 2 shows a sectional view taken on the line 2—3 of Fig. 1 looking in the direction of the uppermost arrow.

Fig. 3 shows a sectional view taken on the line 2—3 of Fig. 1 looking in the direction of the lowermost arrow.

Fig. 4 shows a detailed sectional view illustrating the cam mechanism for controlling the feeding motion of the reaming tool.

Figs 5, 6, and 7 show diagrams illustrating the different positions of the drills and reamer in the operation of forming sleeves or bushings.

Fig. 8 shows a detailed view of a cutting tool employed in this type of machine.

In the present application, I show a four spindle automatic screw machine of the Gridley type, but my invention is not to be considered as limited in its application to this particular form of machine. This machine comprises a turret A carrying four spindles B rotated in any suitable manner. A tool holder is shown at C and is fitted with a plurality of tool slides D. The tools carried in these slides are fed forward by cam mechanism E.

A specific instance will be given in order to better explain my invention. Assume it is desirable to drill and ream bushings or sleeves, say to a depth of six inches. In the standard type of Gridley machine, this would be carried on as follows: Each of the four spindles carries a bar of stock and the turret would be indexed to make three or four stops in a complete revolution. At the first stop, the bar would be drilled by the first drill in the tool holder to a depth of six inches. At the second stop, the bar would be reamed the full depth of its bore, while the drill would be working on a new bar. At the third stop, the bar is cut off and shoved forward, the drill and reamer in the meantime working on other bars. There is a decided loss in time here for the reason that there are four bars to be worked on simultaneously and an extra drill might be inserted in the tool holder and set so that each drill would bore but three inches, the second drill completing the bore started by the first. This would cut the time interval of drilling in two, but inasmuch as in the standard machine the reamer is fed forward at the same rate as the drills, it is obvious that the reamer could not make a six inch bore while the drills were forming a three inch bore. The solution is to speed up the advance motion of the reamer, and I do this by providing a separate cam mechanism which will feed the reamer forwardly six inches while the drills are being advanced but half that distance. Thus, all four bars are being worked on simultaneously, the first drill serving to form the first three inches of the bore, the second drill forming the last three inches of the bore, the reamer serving to ream the full depth of the bore, while the bar previously worked on by these tools is being cut off and shoved forward. The second drill is set three inches ahead of the first and both drills are retracted far enough to clear the bar or stock, the cam mechanism for feeding the drills being so shaped that a quick preliminary motion is given to the drills to bring them to the starting point of their work.

In the drawings, drills 10 and 11 are carried by the tool holder C in the usual way, the drill 11 being set ahead of the drill 10 for the reason given above. A reamer 12 is carried in a separate holder 13 which is slidably mounted on a guide 14. A bell crank lever 15 is mounted on the machine and connects with the tool holder 14 by means of a link 16. A rotatable disc 17 having an internal cam face 18 shaped as shown in Fig. 4 actuates the bell crank lever to feed the tool holder 13 forwardly at the desired increase in speed. A cam 19 retracts the tool holder when the cam face 18 passes the arm of the bell crank lever.

The machine is otherwise standard and includes a cutoff tool 20 stationarily mounted on the frame of the machine for cutting off the bar after the same has been drilled and reamed.

Various changes in construction and arrangement of the several parts may be employed without departing from the spirit of my invention as disclosed in the appended claims.

Having thus described my invention, what I claim and desire to secure by Letters Patent is:

1. In a multiple spindle screw machine, a tool slide, a plurality of drills carried thereby, cam means for actuating the tool slide and moving said drills in unison into engagement with their respective blanks, a second tool slide mounted independently of the first mentioned slide, a reamer carried by the second mentioned slide, and cam means for feeding the second slide forwardly at a different speed from that of the first mentioned slide, said reamer being held in operative position with a blank while said drills are in operation.

2. In a multiple spindle screw machine, a plurality of rotatable work holding spindles, a tool slide, a plurality of drills carried by said slide, means for simultaneously advancing all of said drills toward their respective spindles, a second tool slide mounted independently of the first slide, a reamer carried by the second slide, and cam means for advancing the second slide and reamer toward its spindle at a greater speed than the drills, one of said drills being normally positioned in advance of the reamer and the remainder of the drills, and all of said drills and said reamer being adapted to operate simultaneously upon a series of blanks carried by the several spindles.

In testimony whereof I have hereunto set my hand.

PHILLIP A. UDALL.